(12) United States Patent
Lim et al.

(10) Patent No.: US 8,749,498 B2
(45) Date of Patent: *Jun. 10, 2014

(54) TOUCH PANEL AND ELECTRONIC DEVICE INCLUDING THE SAME

(75) Inventors: Seong-taek Lim, Suwon-si (KR); Sung-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 871 days.

This patent is subject to a terminal disclaimer.

(21) Appl. No.: 12/780,996

(22) Filed: May 17, 2010

(65) Prior Publication Data

US 2010/0321335 A1   Dec. 23, 2010

(30) Foreign Application Priority Data

Jun. 19, 2009 (KR) ........................ 10-2009-0055034

(51) Int. Cl.
*G06F 3/041* (2006.01)

(52) U.S. Cl.
USPC ........................................ 345/173

(58) Field of Classification Search
USPC ................ 340/407.1, 407.2; 434/112–117
See application file for complete search history.

(56) References Cited

U.S. PATENT DOCUMENTS

| | | | |
|---|---|---|---|
| 4,923,057 A | 5/1990 | Carlson et al. | |
| 4,963,417 A | 10/1990 | Taniguchi et al. | |
| 5,055,840 A | 10/1991 | Bartlett | |
| 5,222,895 A | 6/1993 | Fricke | |
| 5,856,822 A | 1/1999 | Du et al. | |
| 5,977,867 A | 11/1999 | Blouin | |
| 6,118,435 A | 9/2000 | Fujita et al. | |
| 6,278,439 B1 | 8/2001 | Rosenberg et al. | |
| 6,317,116 B1 | 11/2001 | Rosenberg et al. | |
| 6,429,846 B2 | 8/2002 | Rosenberg et al. | |
| 6,809,462 B2 | 10/2004 | Pelrine et al. | |

(Continued)

FOREIGN PATENT DOCUMENTS

| | | |
|---|---|---|
| CN | 1829951 A | 6/2006 |
| EP | 2 026 178 A1 | 2/2009 |

(Continued)

OTHER PUBLICATIONS

Extended European search report dated Oct. 7, 2010 issued by the European Patent Office in counterpart European Application No. 10166013.2.

(Continued)

*Primary Examiner* — Quan-Zhen Wang
*Assistant Examiner* — Chad Dicke
(74) *Attorney, Agent, or Firm* — Sughrue Mion, PLLC

(57) ABSTRACT

A touch panel and an electronic device are provided. The touch panel includes a first substrate; a second substrate that is spaced apart from the first substrate by a gap and includes a contact surface; driving electrodes that are formed on each of the first substrate and the second substrate; and electrorheological fluid that is disposed in the gap. When a driving voltage is applied between the driving electrodes, a button area is delimited due to a variation in viscosity of the electrorheological fluid at the button area. When a thickness of the gap is reduced to a value equal to or less than a threshold due to a pressing force applied to the contact surface at the button area, the driving voltage is cut off.

27 Claims, 12 Drawing Sheets

(56) References Cited

U.S. PATENT DOCUMENTS

| | | |
|---|---|---|
| 7,051,292 B2 | 5/2006 | Nagase |
| 7,067,756 B2 | 6/2006 | Cok |
| 7,131,073 B2 | 10/2006 | Rosenberg et al. |
| 7,196,688 B2 | 3/2007 | Schena |
| 7,202,837 B2 | 4/2007 | Ihara |
| 7,268,770 B1 | 9/2007 | Takahata et al. |
| 7,339,572 B2 | 3/2008 | Schena |
| 7,342,573 B2 | 3/2008 | Ryynaenen et al. |
| 7,436,396 B2 | 10/2008 | Akieda et al. |
| 7,477,242 B2 | 1/2009 | Cross et al. |
| 7,511,706 B2 | 3/2009 | Schena |
| 7,589,714 B2 | 9/2009 | Funaki |
| 7,598,949 B2 | 10/2009 | Han |
| 7,608,976 B1 | 10/2009 | Cheng et al. |
| 7,679,611 B2 | 3/2010 | Schena |
| 7,688,080 B2 | 3/2010 | Golovchenko et al. |
| 7,719,167 B2 | 5/2010 | Kwon et al. |
| 8,164,573 B2 | 4/2012 | DaCosta et al. |
| 8,345,013 B2 | 1/2013 | Heubel et al. |
| 8,581,866 B2 | 11/2013 | Park et al. |
| 2001/0026636 A1 | 10/2001 | Mainguet |
| 2001/0035854 A1 | 11/2001 | Rosenberg et al. |
| 2002/0033795 A1 | 3/2002 | Shahoian et al. |
| 2002/0039620 A1 | 4/2002 | Shahinpoor et al. |
| 2002/0101410 A1 | 8/2002 | Sakata et al. |
| 2003/0016849 A1 | 1/2003 | Andrade |
| 2004/0090426 A1 | 5/2004 | Bourdelais et al. |
| 2005/0057528 A1 | 3/2005 | Kleen |
| 2005/0076824 A1 | 4/2005 | Cross et al. |
| 2005/0130604 A1 | 6/2005 | Chipchase et al. |
| 2005/0200286 A1 | 9/2005 | Stoschek et al. |
| 2005/0285846 A1 | 12/2005 | Funaki |
| 2006/0099808 A1 | 5/2006 | Kondo |
| 2006/0103634 A1 | 5/2006 | Kim et al. |
| 2006/0119589 A1 | 8/2006 | Rosenberg et al. |
| 2006/0097991 A1 | 11/2006 | Hotelling et al. |
| 2007/0080951 A1 | 4/2007 | Maruyama et al. |
| 2007/0152982 A1 | 5/2007 | Kim et al. |
| 2007/0152974 A1 | 7/2007 | Kim et al. |
| 2007/0182718 A1* | 8/2007 | Schoener et al. ............. 345/173 |
| 2007/0211032 A1 | 9/2007 | Ahn et al. |
| 2007/0229464 A1 | 10/2007 | Hotelling et al. |
| 2008/0007815 A1 | 1/2008 | Liang et al. |
| 2008/0024459 A1 | 1/2008 | Poupyrev et al. |
| 2008/0024461 A1 | 1/2008 | Richter et al. |
| 2008/0036746 A1 | 2/2008 | Klinghult |
| 2008/0158169 A1 | 3/2008 | O'Connor et al. |
| 2008/0100590 A1 | 5/2008 | Hur et al. |
| 2008/0111788 A1 | 5/2008 | Rosenberg et al. |
| 2008/0143689 A1 | 6/2008 | Foo et al. |
| 2008/0165158 A1 | 7/2008 | Hotelling et al. |
| 2008/0165134 A1 | 10/2008 | Krah |
| 2008/0284277 A1 | 11/2008 | Kwon et al. |
| 2009/0002199 A1 | 1/2009 | Lainonen et al. |
| 2009/0002328 A1 | 1/2009 | Ullrich |
| 2009/0046065 A1 | 2/2009 | Liu et al. |
| 2009/0046068 A1 | 2/2009 | Griffin |
| 2009/0075694 A1 | 3/2009 | Kim et al. |
| 2009/0085878 A1 | 4/2009 | Heubel et al. |
| 2009/0182501 A1 | 7/2009 | Fyke et al. |
| 2009/0231305 A1 | 9/2009 | Hotelling et al. |
| 2009/0308737 A1 | 12/2009 | Kudoh |
| 2010/0024573 A1 | 2/2010 | Daverman et al. |
| 2010/0026655 A1 | 2/2010 | Harley |
| 2010/0059295 A1 | 3/2010 | Hotelling et al. |
| 2010/0060610 A1 | 3/2010 | Wu |
| 2010/0149108 A1 | 6/2010 | Hotelling et al. |
| 2010/0156829 A1 | 6/2010 | Shimodaira |
| 2010/0214232 A1 | 8/2010 | Chan et al. |
| 2010/0259485 A1 | 10/2010 | Chuang |
| 2010/0321330 A1 | 12/2010 | Lim et al. |
| 2010/0321335 A1 | 12/2010 | Lim et al. |
| 2011/0057899 A1 | 3/2011 | Sleeman et al. |
| 2011/0163978 A1 | 7/2011 | Park et al. |
| 2011/0181530 A1 | 7/2011 | Park et al. |
| 2011/0227862 A1 | 9/2011 | Lim |
| 2011/0279374 A1 | 11/2011 | Park et al. |
| 2012/0019467 A1 | 1/2012 | Hotelling et al. |
| 2012/0038563 A1 | 2/2012 | Park et al. |
| 2012/0086651 A1 | 4/2012 | Kwon et al. |
| 2012/0127122 A1 | 5/2012 | Lim |
| 2012/0262410 A1 | 10/2012 | Lim |

FOREIGN PATENT DOCUMENTS

| | | |
|---|---|---|
| JP | 6-34940 A | 2/1994 |
| JP | 09-319509 A | 12/1997 |
| JP | 11-203025 A | 7/1999 |
| JP | 11-273501 A | 10/1999 |
| JP | 2000-066782 A | 3/2000 |
| JP | 2001-282433 A | 10/2001 |
| JP | 2002-157087 A | 5/2002 |
| JP | 2002-342035 A | 11/2002 |
| JP | 2004-71765 A | 3/2004 |
| JP | 2005-107804 A | 4/2005 |
| JP | 2005-135876 A | 5/2005 |
| JP | 2005-275632 A | 10/2005 |
| JP | 2006-011646 A | 1/2006 |
| JP | 2006-146611 A | 6/2006 |
| JP | 2007-513392 A | 5/2007 |
| JP | 2008-33739 A | 2/2008 |
| JP | 2008-257748 A | 10/2008 |
| JP | 2010-016969 A | 1/2010 |
| JP | 2010-079882 A | 4/2010 |
| JP | 2010-108505 A | 5/2010 |
| JP | 2011-3177 | 1/2011 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0126760 A | 12/2009 |
| KR | 10-2010-0011368 A | 2/2010 |
| KR | 10-2010-0020065 A | 2/2010 |
| KR | 10-2010-0136759 A | 12/2010 |
| WO | 03/050754 A1 | 6/2003 |
| WO | 2004/014115 A1 | 2/2004 |
| WO | 2004/053909 A1 | 6/2004 |
| WO | 2004/106099 A1 | 12/2004 |
| WO | 2005/010735 A1 | 2/2005 |
| WO | 2005/091257 A1 | 9/2005 |
| WO | 2008/037275 A1 | 4/2008 |
| WO | 2009/002605 A1 | 12/2008 |

OTHER PUBLICATIONS

US Advisory Action, dated Apr. 26, 2013, issued in U.S. Appl. No. 12/849,310.

Final US Office Action, dated Dec. 20, 2012, issued in U.S. Appl. No. 12/849,310.

Non-Final US Office Action, dated Aug. 28, 2012, issued in U.S. Appl. No. 12/849,310.

Final US Office Action, dated Mar. 27, 2013, issued in U.S. Appl. No. 12/948,479.

Non-Final US Office Action, dated Oct. 15, 2012, issued in U.S. Appl. No. 12/948,479.

Non-Final US Office Action, dated Feb. 1, 2013, issued in U.S. Appl. No. 13/103,221.

(56) References Cited

OTHER PUBLICATIONS

Non-Final US Office Action, dated Apr. 22, 2013, issued in U.S. Appl. No. 13/050,550.
Non-Final US Election Requirement, dated Apr. 10, 2013, issued in U.S. Appl. No. 13/097,937.
European Communication, dated Mar. 19, 2013, issued in European Application No. 11150285.2.
Non-Final US Office Action, dated May 7, 2013, issued in U.S. Appl. No. 12/719,281.
Non-Final US Office Action, dated Mar. 15, 2013, issued in U.S. Appl. No. 12/889,800.
Chinese Office Action dated Oct. 10, 2013 issued in Application No. 201010200349.1.
U.S. Final Office Action dated Dec. 5, 2013, Issued in U.S. Appl. No. 13/050,550.
U.S. Final Office Action dated Nov. 22, 2013, issued in U.S. Appl. No. 12/849,310.
U.S. Non-Final Office Action dated Aug. 12, 2013 issued in U.S. Appl. No. 13/224,422.
U.S. Non-Final Office Action dated Aug. 16, 2013, issued in U.S. Appl. No. 12/889,800.
U.S. Non-Final Office Action dated Jul. 17, 2013, issued in U.S. Appl. No. 13/097,937.
U.S. Non-Final Office Action dated Dec. 6, 2013 issued in U.S. Appl. No. 13/190,120.
U.S. Non-Final Office Action dated Jul. 8, 2013, issued in U.S. Appl. No. 12/849,310.
U.S. Notice of Allowance dated Sep. 19, 2013 issued in U.S. Appl. No. 12/719,281.
Non-Final Office Action, dated Feb. 10, 2014, issued by the USPTO in related U.S. Appl. No. 12/719,281.
Communication, dated Mar. 4, 2014, issued by the Japanese Patent Office in counterpart Japanese Patent Application No. 2010-133879.
Notice of Allowance, dated Mar. 28, 2014, issued in related U.S. Appl. No. 12/849,310.
Final US Office Action, dated Apr. 3, 2014, issued in related U.S. Appl. No. 12/889,800.
Final US Office Action, dated Mar. 7, 2014, issued in related U.S. Appl. No. 13/097,937.
Non-Final US Office Action, dated Mar. 7, 2014, issued in related U.S. Appl. No. 13/224,422.

* cited by examiner

TOUCH PANEL AND ELECTRONIC DEVICE INCLUDING THE SAME

CROSS-REFERENCE TO RELATED APPLICATION

This application claims priority from Korean Patent Application No. 10-2009-55034, filed on Jun. 19, 2009, the disclosure of which is incorporated by reference in its entirety.

BACKGROUND

1. Field

Apparatuses and devices consistent with the following description relates to a user input device, and more particularly, to a touch panel used in a user input device and an electronic device including the same.

2. Description of the Related Art

A touch panel is one example of a kind of user input device used to determine whether a user generates an input and the position of the user's input by sensing the user's contact thereon. A user may input data or signals to a touch panel by contacting or pressing a surface of the touch panel with his or her finger, a stylus pen or the like. The touch panel may be used in association with a display. A touch panel which is mounted on the screen of a display device, such as a liquid crystal display (LCD), a plasma display panel (PDP), cathode ray tube (CRT) and the like, is generally called a "touch screen". A touch panel may be integrated with a display device to configure the screen of the display device or may be attached additionally on the screen of the display device.

In certain situations, a touch panel may be substituted for a user input device such as a keyboard, trackball or mouse, and also may allow for simple manipulations. Moreover, the touch panel can provide users with various types of buttons according to the types of applications to be executed or stages of the executed application. Accordingly, a touch panel, and more specifically, a touch screen, has been used as an input device for electronic equipment, such as a mobile phone, a personal digital assistant (PDA), a portable multimedia player (PMP), a digital camera, a portable games, a Moving Picture Experts Group Layer-3 (MP3) player, etc., as well as an automated teller machine (ATM), an information trader, a ticket vending machine, etc.

A touch panel can be classified into a resistive type, a capacitive type, a saw type, an infrared type, etc., according to methods of sensing user's inputs. A capacitive type touch panel determines whether a user generates an input and the position of the user's input by measuring variations in capacitance due to contact or pressure. However, the various types of touch panels fail to provide users a sense of input, that is, a feeling of recognition that a user gets upon inputting. In order to overcome this disadvantage, a method of installing a vibration motor below a touch panel has been proposed. The method offers users a sense of input by vibrating the whole touch panel using the vibration motor when a user's contact is sensed.

SUMMARY

One or more embodiments relate to a touch panel on which provides the ability to identify a button through tactile sense, and an electronic device including the touch panel.

One or more embodiments also relate to a touch panel which provides a clicking sensation similar to that experienced when pressing a general keypad or button, and an electronic device including the touch panel.

According to an aspect of an embodiment, there is provided a touch panel including a first substrate and a second substrate. The second substrate is spaced apart from the first substrate by a gap and includes a user contact surface. A plurality of driving electrodes are formed on each of the first substrate and the second substrate, and the gap between the first substrate and the second substrate is filled with electro-rheological fluid. If a driving voltage is applied to one or more of the plurality of driving electrodes, a button area for inputting a signal having a pattern is defined due to a variation in viscosity of the electro-rheological fluid, and if the button area is pressed so that a thickness of the gap becomes equal to or less than a threshold value, the driving voltage is cut off.

According to an aspect of another embodiment, there is provided a touch panel including a first substrate, a second substrate, a plurality of driving electrodes and electro-rheological fluid. The second substrate is spaced apart from the first substrate by a gap and the second substrate comprises a user contact surface thereon. The plurality of driving electrodes includes a first electrode formed on the first substrate and a second electrode formed on the second substrate, and the electro-rheological fluid is filled in the predetermined gap between the first substrate and the second substrate. The user contact surface is divided into a first area in which a viscosity of electro-rheological fluid increases and a second area in which a viscosity of electro-rheological fluid does not vary, due to an electric field formed by all or some of the plurality of driving electrodes, and the first area is defined as a button area for inputting a signal on the user contact surface.

According to an aspect of another embodiment, there is provided a touch panel including a hard, transparent lower substrate and a deformable, transparent upper substrate spaced apart from the lower substrate by a gap. The touch panel includes a plurality of driving electrodes including a first electrode formed on the first substrate and a second electrode formed on the second substrate, a plurality of elastic spacers placed in a dispersed manner in the gap between the upper substrate and the lower substrate, and electro-rheological fluid filled in the predetermined gap. An area in which a viscosity of the electro-rheological fluid increases locally due to an electric field formed by a driving voltage is defined as a button area.

According to an aspect of another embodiment, there is provided an electronic device including a pair of substrates, a plurality of driving electrodes, electro-rheological fluid and a controller. The pair of substrates include of a first substrate and a deformable second substrate spaced from the first substrate. The plurality of driving electrodes include a first electrode formed on the first substrate and a second electrode formed on the second substrate. The electro-rheological fluid is filled in a gap between the pair of substrates, and the controller controls a driving voltage to be applied to all or some of the plurality of driving electrodes.

BRIEF DESCRIPTION OF THE DRAWINGS

The above and/or other aspects will be more apparent from the following detailed description taken with reference to the accompanying drawings, in which:

FIGS. 4A and 4B are views showing a structure of the touch panel, wherein FIG. 4A is a perspective view showing separated upper and lower substrates of the touch panel and FIG. 4B is a cross-sectional view of the touch panel with the upper and lower substrates coupled together;

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

In this description of embodiments, a touch panel is a kind of user input device and may be mounted onto various devices. For example, the touch panel may be a user input device having variable buttons whose types, sizes, shapes, numbers, etc. vary according to an application that is being executed or according to stages of the executed application. However, the touch panel is not limited to this, and may be mounted onto an electronic device including fixed input buttons.

The touch panel may be used in an electronic device having as a user interface a touch screen in which buttons are displayed on a display therebelow. Specifically, the buttons that are displayed on the display may be numeric keys, Qwerty keys, icon menus, or menu bars, etc., and various combinations in the type, size, shape and/or number of the buttons are also allowed. A display, such as a liquid crystal display (LCD), an organic light emitting diode (OLED) display, etc., may be used with the touch panel, and any other display may also be used along with various combinations in the type, size, shape and/or number, etc. of buttons.

Figure 1A:
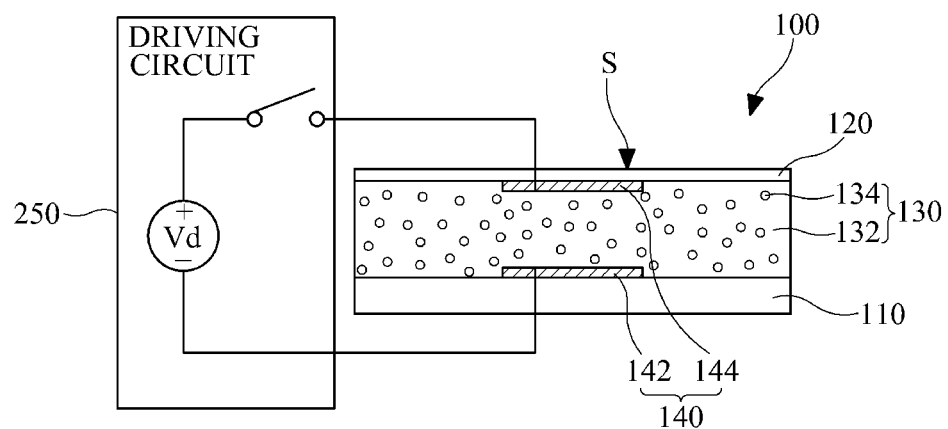
FIGS. 1A and 1B are cross-sectional views showing an exemplary touch panel, in which FIG. 1A corresponds to a configuration where no driving voltage is supplied and FIG. 1B corresponds to a configuration where a driving voltage is supplied.
Figure 1B:
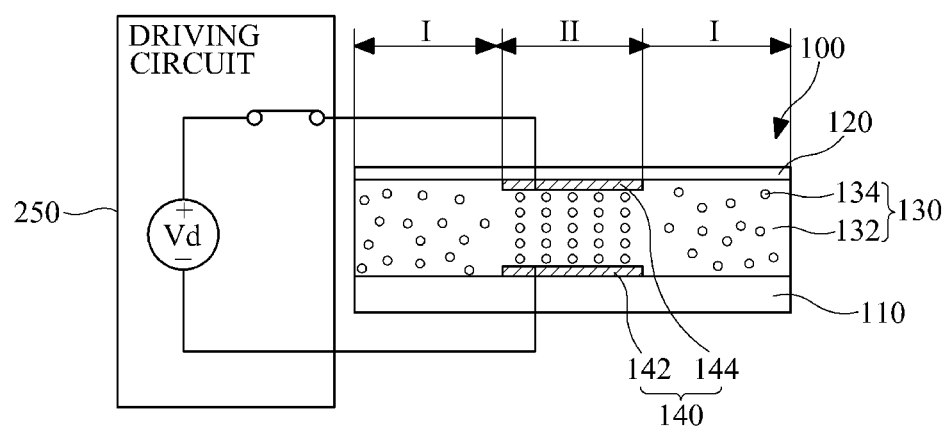

FIGS. 1A and 1B are cross-sectional views showing a touch panel 100 according to an embodiment of the present invention, wherein FIG. 1A corresponds to a configuration in which no driving voltage $V_d$ is supplied and FIG. 1B corresponds to a configuration in which a driving voltage $V_d$ is supplied. In FIGS. 1A and 1B, dimensions such as the thicknesses of substrates and the electro-rheological fluid, the sizes of particles, etc. are exaggerated for clarity.

Referring to FIG. 1A, the touch panel 100 includes a pair of substrates (that is, a lower substrate 110 and an upper substrate 120), electro-rheological fluid (ERF) 130 filled between the substrates 110 and 120 and sealed, and driving electrodes 140.

The lower substrate 110 may be placed on a display of electronic equipment. The lower substrate 110 may be configured so as not to be deformed when a certain attractive force or repulsive force is applied between the lower substrate 110 and the upper substrate 120. For prevention of deformation, the lower substrate 110 may be made of a hard substance, such as, for example, transparent glass. However, there are situations in which it is advantageous for the lower substrate 110 to be made of a material that is not a hard substance. For example, when the touch panel 100 is attached onto a hard display, the lower substrate 110 may be made of a transparent polymer film.

An upper or lower side surface of the upper substrate 120 is a user contact surface (S) which a user contacts when generating an input signal. The upper substrate 120 may be deformed when a certain force is applied thereon. For example, when the user contact surface S is pressed by a certain external force or due to local pressure from the electro-rheological fluid 130, the upper substrate 120 may be deformed. In order to provide such deformation, the upper substrate 120 may be made of a transparent, deformable polymer film or the like. Also, the upper substrate 120 may be spaced apart from the lower substrate 10, so that a gap is formed between the upper substrate 120 and the lower substrate 110. The gap may be a predetermined distance.

The electro-rheological fluid 130 is filled in the gap between the lower substrate 110 and the upper substrate 120 and sealed. In order to seal the electro-rheological fluid 130, a sealant 150 (see FIG. 4B) may be applied to facing edge portions of one or both of the upper and lower substrates 110 and 120. The electro-rheological fluid 130 is a suspension in which fine particles 134 are dispersed in electro-insulative fluid 132. For example, a size of the particles 134 may be on the order of about a hundred microns. The viscosity of the electro-rheological fluid 130 varies maximally by 100,000 times when an electric field is applied thereto, and since such variation in viscosity is reversible, the viscosity returns to its original level when the electronic field disappears. The variation in viscosity caused when an electric field is formed in the electro-rheological fluid 130 will be described in more detail with reference to FIG. 1B, below.

The electro-insulative fluid 132 of the electro-rheological fluid 130 may be a transparent liquid such as, for example, silicon oil, kerosene mineral oil, olefin (PCBs), or the like. However, the electro-insulative fluid 132 may be any other material that possesses similar properties of low viscosity change with changing temperature, high flash point, low freezing point, etc. The particles included in the electro-rheological fluid 130 are advantageously very fine, transparent particles having a maximum size of about 50 μm. However, the particle size is advantageously on the order of a few microns. The particles may be polymers, such as aluminosilicate, polyanilin, polypyrrole, fullerene, or any other kind of insulative materials, such as ceramics, or the like. Non-transparent ERF may also be used in some applications.

Also, spacers 136 (see FIG. 4B) may be provided in a dispersed manner in the gap between the upper and lower substrates 120 and 110. The spacers are elastic elements and made of small, transparent particles whose size is less than several tens of micrometers. Materials used to form the spacers are not limited, and for example, the spacers may be made of an elastomer, such as silicon rubber or the like. The spacers are used to provide the upper substrate 120 with restoring force and support the upper substrate 120 structurally. That is, the spacers operate as elastic elements between the upper and lower substrate, and allow the substrates to recover the original film shape in a very short time after a click operation, which will be described later. The spacers are advantageously spaced throughout the touch panel 100 in a uniform manner. However, other types of distribution patterns may be used as long as the spacers may provide the restoring force and structural support. For example, at the edge side of the touch panel, the film tension is stronger than that of the center portion. Thus, it may be possible use fewer spacers in the edge side region. That is, the spacer distribution may be varied depending on the location within the touch panel 100.

The driving voltage $V_d$ is provided, for example, by a driving circuit 250, to drive the touch panel 100 and thus vary the viscosity of the electro-rheological fluid 130, and may be supplied from a power supply of electronic equipment on which the touch panel 100 is mounted. The driving voltage $V_d$ is used to delimit a button area on the user contact surface S, and provides a user with a clicking sensation when pressing a part of the button area. For this, the touch panel 100 may include a controller (not shown) to control the operation of the touch panel 100. In this exemplary configuration, the controller is connected to a sensing unit (not shown) which senses any input from a user, and controls the driving voltage $V_d$ to be applied to an upper electrode 144 and a lower electrode 142 of the driving electrodes 140. That is, the controller controls the on/off state of a switch, according to an user's input signal sensed by the sensing unit. The controller may be implemented as an electrical circuit for controlling electronic equipment on which the touch panel 100 is mounted, or as a part of a microprocessor or a separate electrical circuit.

The sensing unit of the touch panel 100 senses a user's input or a degree of a user's input, and generates a signal according to the presence or amount of a user's input. The sensing unit may also sense only the presence of a user's input with respect to the button area. Alternatively, the sensing unit may sense a degree of a user's input as one level from a plurality of possible levels, in addition to the presence of the user's input. For example, thickness differences of the gap between the upper and lower substrates 120 and 110 in the button area may be divided into a plurality of levels, so that a level or amount of a user input is determined depending on how wide the gap is, that is, which level of the plurality of levels the gap width corresponds to. The gap size may be measured by the capacitance change between the upper electrode and the lower electrode.

FIG. 1B is a cross-sectional view of the touch panel 100 in a configuration in which the driving voltage $V_d$ is supplied by the driving circuit 250 to the driving electrodes 140 of the touch panel 100. As described above, the driving electrodes 140 are used to delimit a button area and provide a clicking sensation to a user when the user presses a part of the button area. This process of delimiting the button area will be described in more detail later. Hereinafter, an area of the touch panel 100 on which no electric field is formed regardless of the presence or absence of the driving electrodes 140 is denoted as "a first area I" and an area of the touch panel 100 on which an electric field is formed is denoted as "a second area II".

When a driving voltage is applied to the touch panel 100, electro-rheological fluid 130 located in the second area II reacts in response to an electric field formed between the driving electrodes 140, so that the viscosity of the electro-rheological field 130 may increase to a maximum of about 100,000 times in a very short time period, for example, on the order of a few milliseconds. For example, a viscosity change of 100,000 times typically occurs at 1 V/µm electric field intensity and 0.00001 (1/s) shear rate. Since such variation in viscosity of the electro-rheological field 130 may happen reversibly, the viscosity of the electro-rheological field 130 is lowered to its original degree if the electric field disappears. This change similarly occurs in a very short period, for example, on the order of a few milliseconds. The viscosity of the electro-rheological field 130 changes as a function of the electric field intensity (in V/µm) and increases under an electric field because the particles 134 having a polarization behavior become aligned along the orientation of the electric field, as illustrated in FIG. 1B.

When a driving voltage is applied to the driving electrodes 140, the viscosity of the electro-rheological fluid 130 located in the second area II sharply increases, but the viscosity of the electro-rheological fluid 130 located in the first area I is maintained in its current state. Consequently, a significant difference in viscosity occurs between the first and second areas I and II. Due to this significant difference in viscosity, the second area II of the touch panel 100 provides a repulsive force which is proportional to a user's pressing force. Also, if the driving voltage continues to be supplied in the situation illustrated in FIG. 1 B, the fluidity of the electro-rheological fluid 130 located in the first area I is limited due to the second region II.

As such, when a driving voltage applied to the touch panel 110 is maintained, the user contact surface S of the upper substrate 120 is partitioned into the first area I and the second area II due to the local increase in viscosity of the electro-rheological fluid 130. That is, by using the first and second areas I and II, a button area may be delimited on the user contact surface S. For example, the second area II in which the viscosity of the electro-rheological fluid 130 increases and in which the repulsive force is raised may be defined as an input button area. Alternatively, the first area I in which the viscosity of the electro-rheological fluid 130 is maintained in its original state may be defined as an input button area, or a part surrounded by the second areas II among the first areas I may be defined as a button area. Alternatively, a combination of areas in which the viscosity is raised and areas in their original state may be used to define a button area. Examples showing the delimiting of a button area using the first and second areas I and II will be provided later below.

As illustrated in FIG. 1B, if a button area is delimited using the first areas I in which the viscosity of the electro-rheological fluid 130 is maintained in its current state and the second area II in which the viscosity of the electro-rheological fluid 130 is increased, the button area may be sensed simply through the sense of touch. This is because if the second area II with increased viscosity is pressed, a user can feel more repulsive force than in the first area I in which the electro-rheological fluid 130 is not driven by the voltage. That is, by contacting or pressing a part of the user contact surface S with a finger, stylus, or other input device, the user may sense whether the contacted or pressed part is hard or soft, thereby determining whether the contacted or pressed part is a button area through sense of touch. Accordingly, a tactile feedback function based on variation in viscosity of the electro-rheological fluid 130 may be implemented on the touch panel 100. If the second area II with increased viscosity of the electro-rheological fluid 130 is pressed while a supplied driving voltage is maintained, the repulsive force of the pressed part gradually increases and accordingly the user can get some sense of input upon pressing a button. Simulation data indicates that a viscosity change of 20 times at 100 (1/s) shear rate typically is adequate to produce a sensation for a user.

Also, the touch panel 110 may offer the user a clicking sensation. The clicking sensation is a sense of "clicking" which a user can feel through his or her finger or pressing tool. In the related art, a similar "clicking" sensation is typically provided when pressing buttons of keys of a mechanical keypad provided on a mobile phone, computer keyboard, etc. Underneath the mechanical keypad, a metal thin plate having a dome shape, which is called a metal dome, is installed. This dome shape is also sometimes called a "popple". When the metal dome is pressed, the user may first sense a repulsive force due to deformation. Once the deformation exceeds a predetermined amount, a buckling point is reached at which point there is a sharp deformation. Due to such a buckling point, the user is provided with a clicking sensation upon pressing a button or key of a mechanical keypad. Also, as the user continues pressing, the shape of the metal dome continues to be deformed beyond the buckling point to thus reach a lower electrode, and at this time, the user's input is recognized by the keypad.

Figure 2:
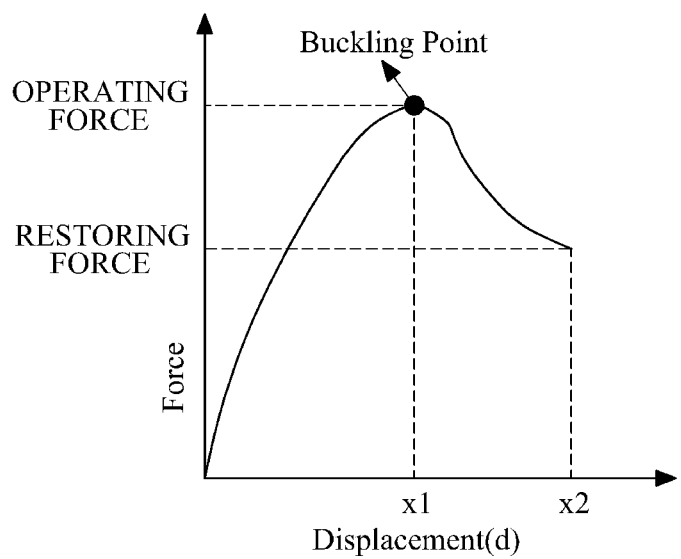
FIG. 2 is a graph showing a relationship of force to displacement of a metal dome structure according to the related art.

FIG. 2 is a graph showing a relationship of force to displacement when a metal dome structure such as the one described above is used. Referring to FIG. 2, at the initial stage, the displacement of the metal dome increases as a user's pressing force increases. As the user's pressing force increases, the supporting force of the metal dome increases and accordingly a repulsive force that is generated by the metal dome structure and felt by the user also increases. Furthermore, the supporting force of the metal dome continues to increase until the user's pressing force reaches a predetermined amount (that is, an operating force). When the displacement of the metal dome reaches ×1, the metal dome reaches the buckling point after which the supporting force of the metal dome sharply decreases. If the user's pressing force is maintained even after the buckling point is reached, the displacement of the metal dome continues to increase. When the displacement of the metal dome reaches ×2, the metal dome reaches the lower electrode. Thereafter, if the user's pressing force disappears, the metal dome returns to its original state by a restoring force.

The touch panel according to the above-described embodiment offers a user an experience similar to a clicking sensation of keys or buttons of a mechanical keypad, a mechanism by which the touch panel according to the above-described exemplary embodiment provides a clicking sensation will be described in detail with reference to FIGS. 3A and 3B.

Figure 3A:
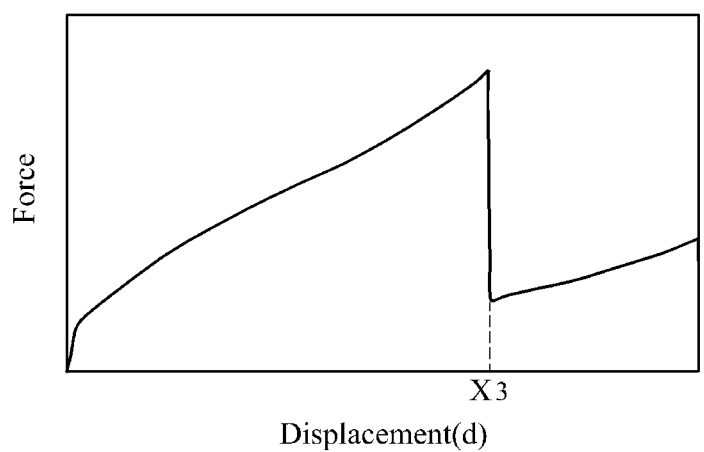
FIG. 3A is a graph showing a relationship of force to displacement of the gap between the opposing driving electrodes according to the touch panel illustrated in FIGS. 1A and 1B.

FIG. 3A is a graph showing a relationship of force to displacement when the touch panel such as FIGS. 1A & 1B is used. And, FIG. 3B is a cross-sectional view of a touch panel at a point at which a user begins to apply a force $F_u$ on the touch panel and FIG. 3C is a cross-sectional view of the touch, panel when the driving voltage is cut off.

Figure 3B:
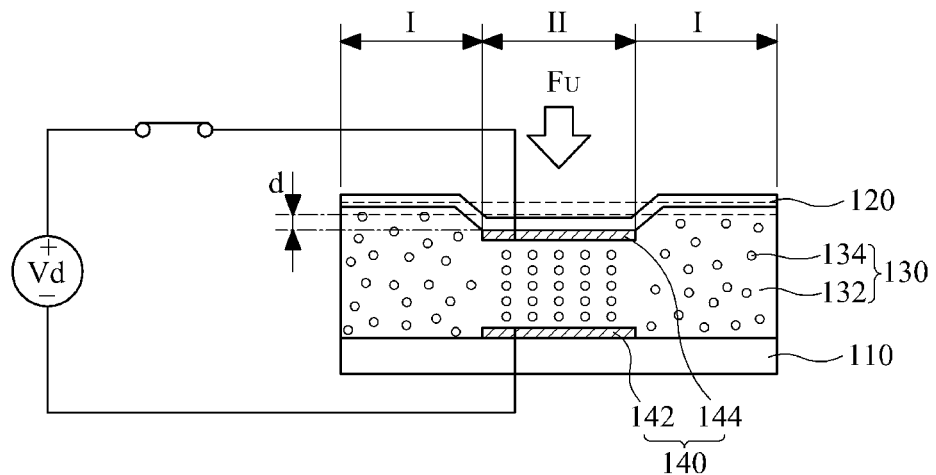
FIGS. 3B and 3C are views showing a mechanism by which a clicking sensation is implemented on the touch panel illustrated in FIGS. 1A and 1B.

Referring to FIGS. 3A & 3B, a driving voltage continues to be supplied as the user applies the force $F_u$, and the electro-rheological fluid 130 of the second region II is maintained at a high viscosity. In FIG. 3B, dotted lines indicate a profile of the upper substrate 120 before a user presses the upper substrate 120. As illustrated in FIG. 3B, when the user presses the second area II, a repulsive force increases in proportion to the user's pressing force $F_u$ and accordingly the user can feel the repulsive force through his or her tactile sense or through the pressing tool.

In this case, the electro-rheological fluid 130 which is a liquid may be deformed by the user's pressing force F. In other words, when a user presses the second area II with a certain force $F_u$, a displacement d occurs in the second area II of the upper substrate 120, so that the gap between the upper and lower substrates 120 and 110 is reduced in the second area II. On the other hand, in correspondence to the displacement d, the gap between the upper and lower substrates 120 and 110 in the first area I may be increased. The displacements involved with the reduced thickness in the second area II and the increased thickness of the gap in the first area I do not have to be equal. If the user continues to press the second area II, the displacement d of the upper substrate 120 further increases and accordingly the repulsive force which is felt by the user also increases. When the force applied by the user exceeds a threshold and thus the displacement d reaches a threshold magnitude ×3, the driving voltage may be cut off so that the viscosity of the electro-rheological fluid 130 returns to its original state. The threshold magnitude may be set based on empirical data. For example, the force profile may be measured as a function of gap size. From the force profile, it is possible to estimate the threshold gap size used to cut off the driving voltage at an appropriate force. Here, it will be understood by those skilled in the art that the magnitude ×3 of the displacement d does not need to be equal to the magnitude ×1 of the displacement at the buckling point of the metal dome as described above.

Figure 3C:
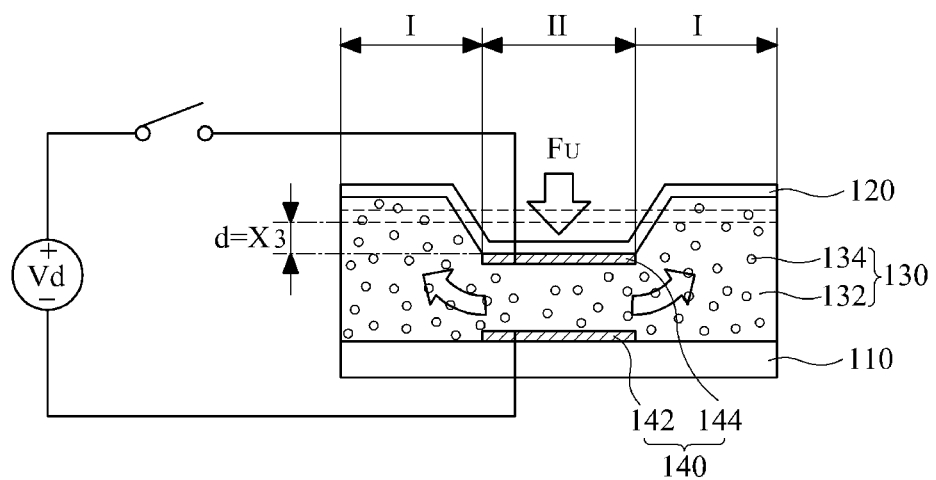

Referring to FIGS. 3B & 3C, when the driving voltage is cut off, an electric field formed in the second area II disappears and consequently the viscosity of the electro-rheological fluid 130 is lowered to its original state, so that the electro-rheological fluid 130 can move freely according to a user's pressing force. Accordingly, at the time at which the driving voltage is cut off, a large amount of electro-rheological fluid 130 instantaneously moves to the peripheral areas, that is, to the first areas I. Hence, the user may feel, at that time, an abrupt reduction of repulsive force from the touch panel, and due to the movement of the electro-rheological fluid 130, the displacement d of the second area II also instantaneously increases substantially. This operation of the touch panel is similar to the operation of keys or buttons of a keypad in which a metal dome has reached the buckling point. Accordingly, by using the above-described configuration according to this exemplary embodiment of the invention, the touch panel may provide a clicking sensation similar to that felt when pressing a key or button of a mechanical keypad.

The magnitude of the displacement d of the pressed second area II depends on the gap between the upper and lower substrates 120 and 110, that is, variation in the gap between the upper and lower substrates 120 and 110. Various methods can be used to measure such a variation in the gap. For example, the variation in the gap size may be sensed according to a variation in capacitance between the driving electrodes of the upper and lower substrates 120 and 110. The details for a method of measuring variation in capacitance is known in the technical art related to capacitive type touch panels, and accordingly a detailed description thereof will be omitted.

In the touch panel according to the above-described embodiment, a user's input is recognized in association with when the driving voltage is cut off. For example, a time at which the driving voltage is cut off may be recognized as a time at which a user's input happens. If the driving voltage is cut off, the corresponding electric field disappears. Accordingly, occurrence of input errors due to unintended slight contact may be avoided.

Alternatively, in the touch panel according to the above-described embodiment, a user's input signal may be recognized in multiple stages regardless of a time when the driving voltage is cut off. For example, degrees of force to be applied on the second area II are divided into a plurality of levels, and when a user touches the touch panel, a level of the user's input may be recognized as one of the levels. In this case, a degree of force applied by a user may be distinguished by a variation in the gap between the upper and lower substrates, that is, for example, by a variation in capacitance due to a variation in the gap.

In this way, after a user presses a button and then the user's input is recognized, the driving voltage may continue to be applied to the touch panel or no driving voltage may be applied to the touch panel. In the case where the driving voltage continues to be applied to the touch panel, the same type of driving voltage applied just before the driving voltage is applied is applied to restore the previous button (that is, since the viscosity of the electro-rheological fluid in the same area increases), or a driving voltage for another application is applied to form a different type of button on the touch panel (that is, since the viscosity of electro-rheological fluid in another area increases). Also, in the case where no driving voltage is applied, there is no area where the viscosity of the electro-rheological fluid increases, so that buttons are no longer created on the touch panel.

Figure 4A:
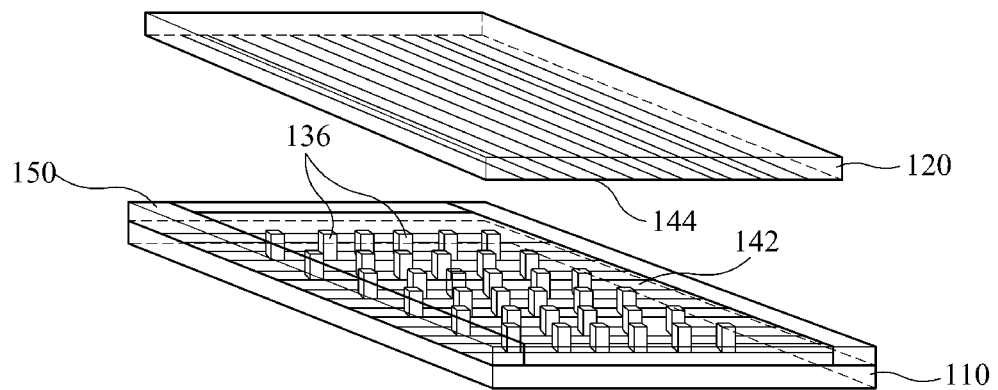
Figure 4B:
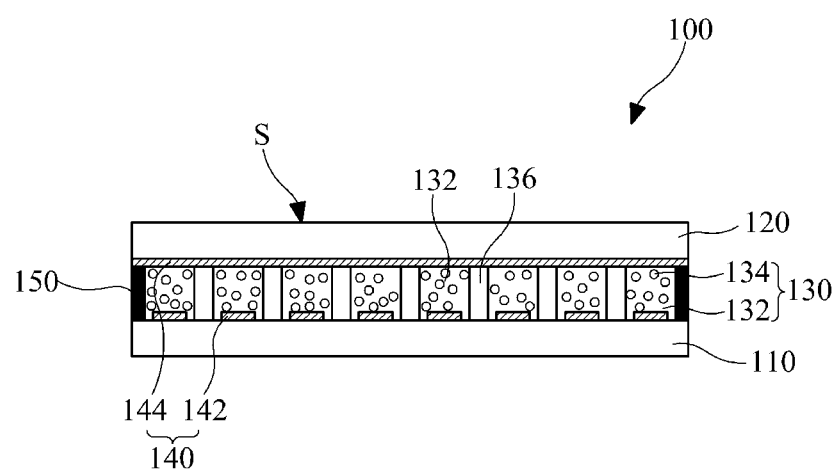

FIGS. 4A and 4B are views showing an example of the structure of the touch panel 100, wherein FIG. 4A is a perspective view showing separated upper and lower substrates of the touch panel and FIG. 4B is a cross-sectional view of the touch panel with the upper and lower substrates coupled together, cut along the longitudinal direction of the upper electrode pattern. In FIGS. 4A and 4B, the thicknesses of substrates, etc., the gap between substrates, the sizes, numbers and arrangements of other components, and so on are exaggerated or simplified for clarity.

Referring to FIGS. 4A and 4B, the touch panel 100 includes a lower substrate 110, an upper substrate 120, an electro-rheological fluid 130, spacers 136, driving electrodes 140 and sealant 150. The lower substrate 110 may be a transparent glass substrate and the upper substrate 120 may be a deformable transparent polymer film. The lower substrate 110 is spaced from the upper substrate 120 by a gap, and in the gap, the electro-rheological fluid 130 and spacers 136 are located. The touch panel 100 may further include a controller and a sensing unit, both of which are not shown in the drawings.

The spacers 136 are very small, elastic elements and may be made of, for example, elastomer or the like. A very large amount of the spacers 136 is evenly distributed throughout the entire space of the gap. For example, on a typical touch panel, the amount of spacers may be on the order of a few hundred spacers. The spacers 136 function to structurally support the upper substrate 120. When no supply voltage is supplied, the spacers 136 allow the user contact surface S to be as flat as possible. If a force is applied to the upper substrate 120, the spacers 136 provide the upper substrate 120 with repulsive force.

The electro-rheologic fluid 130 is filled in the gap between the lower substrate 110 and the upper substrate 120. In the electro-rheological fluid 130, liquid whose refraction index is adjustable may be used as dispersive medium 132 so as to minimize the interfacial reflection between interfaces existing inside the touch panel 100, that is, between the upper and lower substrates 120 and 110 and the electro-rheological fluid 130, and between the driving electrodes 140 and the electro-rheological fluid 130. For example, fluid whose refraction index is adjustable with respect to a material forming the driving electrodes 140 may be used as dispersive medium 132 of the electro-rheological fluid 130. Also, the sealant 150 is applied at the edges of the gap to seal the dispersive medium 132 between the upper substrate 120 and the lower substrate 110. The sealant 150 may be a plastic resin or the like. However, the sealant 150 is not particularly limited thereto.

The driving electrodes 140 are components designed to form an electric field locally between the upper and lower substrates 120 and 110. In the touch panel 100, by varying the combinations of the driving electrodes 140 to form an electric field, the numbers, sizes, shapes, etc. of button areas created on the user contact surface may be reconfigured. For example, in the case of a touch panel which provides a single fixed type of button area, the location, number, size, shape, etc. of the driving electrodes 140 may also be fixed in consideration of the location, number, size, shapes, etc. of the button area. The electrode design depends on the sensing precision and not the driving ERF. Thus, the electrode size may be smaller than the size of the smallest button area. Thus, for example, in the case of a touch panel which provides various types of button area, a plurality of driving electrodes may be arranged in a matrix form throughout the entire area of the touch panel 100. In this case, by varying the combinations of the driving electrodes 140 to which a driving voltage is applied, various types of input button areas may be delimited on the user contact surface of the touch panel 100.

FIGS. 4A and 4B show examples where the driving electrodes 140 are arranged in a matrix form. Referring to FIGS. 4A and 4B, a line-type lower electrode pattern 142 is formed on the upper surface of the lower substrate 110, and a line-type upper electrode pattern 144 is formed on the lower surface of the upper substrate 120. The lower electrode pattern 142 extends in a first direction, and the upper electrode pattern 144 extends in a second direction. As one example, the second direction may be perpendicular to the first direction. Accordingly, the driving electrodes 140 are arranged in a matrix form at intersections of the lower electrode pattern 142 and the upper electrode pattern 144. Alternatively, it is also possible that lower electrodes and upper electrodes facing each other are formed in a dot form on the lower substrate 110 and the upper substrate 120, respectively.

Figure 5:
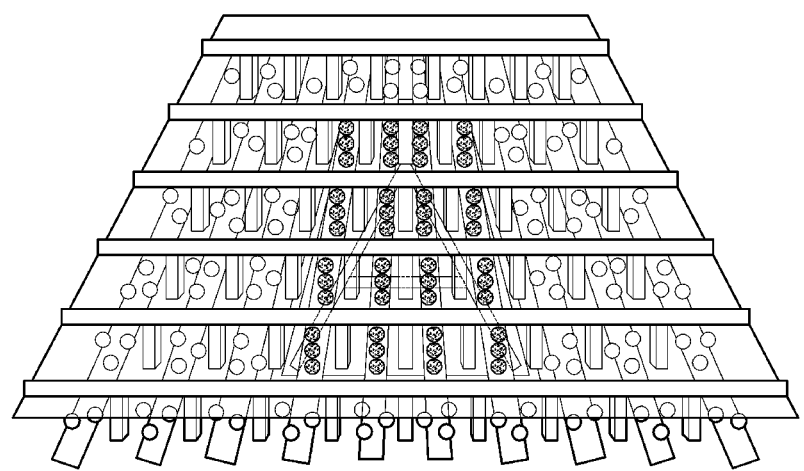
FIG. 5 shows an example in which a button input area is delimited on the touch panel.

FIG. 5 shows an example of a touch panel on which a button area is delimited by applying a driving voltage only to some combinations of driving electrodes. In the touch panel illustrated in FIG. 5, in which a button area is delimited on the user contact surface of an upper substrate, a part to which a supply voltage is applied to form an electric field in electro-rheological fluid is delimited as a button area.

Referring to FIG. 5, by applying an electric field only to driving electrodes (140 in FIG. 4B) that are arranged at locations corresponding to a designated location of a button (an alphabet "A" button) displayed on a display, the viscosity of electro-rheological fluid 130 in the corresponding area is sharply increased. In this way, if a button area is delimited on the touch panel using variation in viscosity of electro-rheological fluid, the button area may be sensed through tactile feel by a user. In the example illustrated in FIG. 5, a user may sense that a portion (that is, a hard portion) having a high viscosity is a button on the touch panel. Accordingly, a tactile feedback function based on the texture of a touch panel may be implemented.

FIGS. 6A and 6B and FIGS. 7A and 7B show additional examples in which button areas are delimited respectively on user contact surfaces of upper substrates in the touch panel described above with reference to FIGS. 4A and 4B. Likewise, in the examples illustrated in FIGS. 6A and 6B, and FIGS. 7A and 7B, by making a portion of a touch panel hard while making the other portion soft, a button area is delimited on the user contact surface.

Figure 6A:
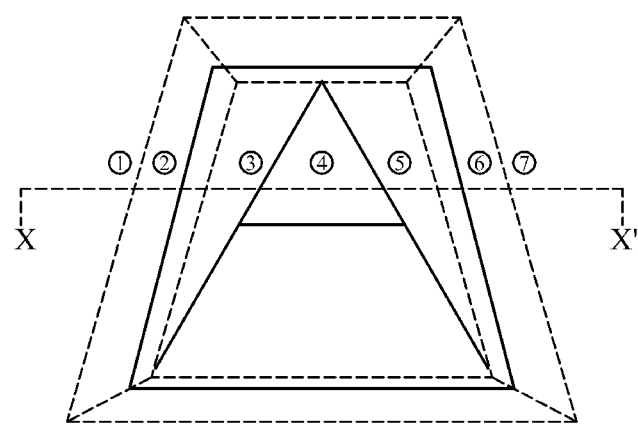
FIGS. 6A and 6B show a perspective and side view, respectively, of an example of a touch panel in which button areas are delimited respectively on user contact surfaces of upper substrates in the touch panel.
Figure 6B:
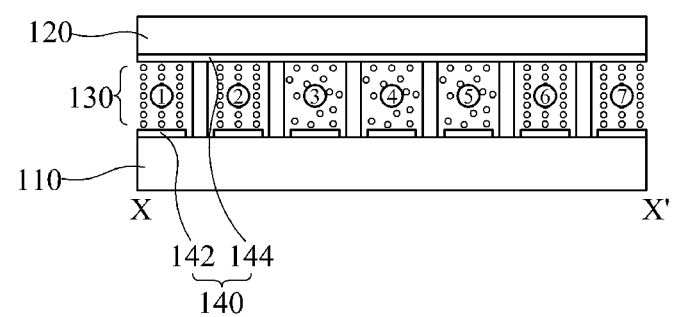

Referring to FIGS. 6A and 6B, no driving voltage is applied to driving electrodes corresponding to parts (③, ④ and ⑤) where a button "A" is displayed on a display, and a driving voltage is applied to driving electrodes corresponding to the peripheral parts (①, ②, ⑥ and ⑦) around the parts where the button "A" is displayed. Accordingly, the parts (③, ④ and ⑤) on which the button "A" is displayed become soft, and the peripheral parts (①, ②, ⑥ and ⑦) become hard. In the current exemplary embodiment, the touch panel parts (③, ④ and ⑤) in which electro-rheological fluid having a low viscosity exists are thus delimited as an input button area. Accordingly, when a user touches the touch panel illustrated in FIGS. 6A and 6B, a user may feel a relatively soft texture on the button area when pressing the "A" button.

Figure 7A:
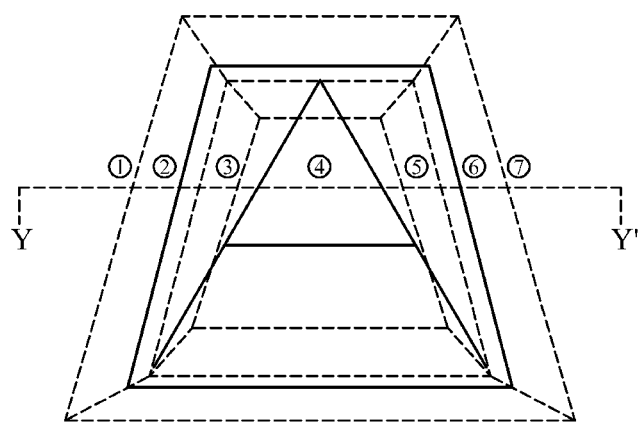
FIGS. 7A and 7B show a perspective and side view, respectively, of an another example of a touch panel in which button areas are delimited respectively on user contact surfaces of upper substrates in the touch panel.
Figure 7B:
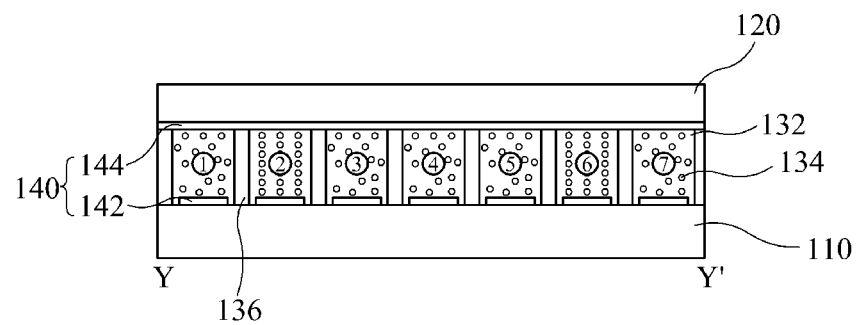
Figure 8A:
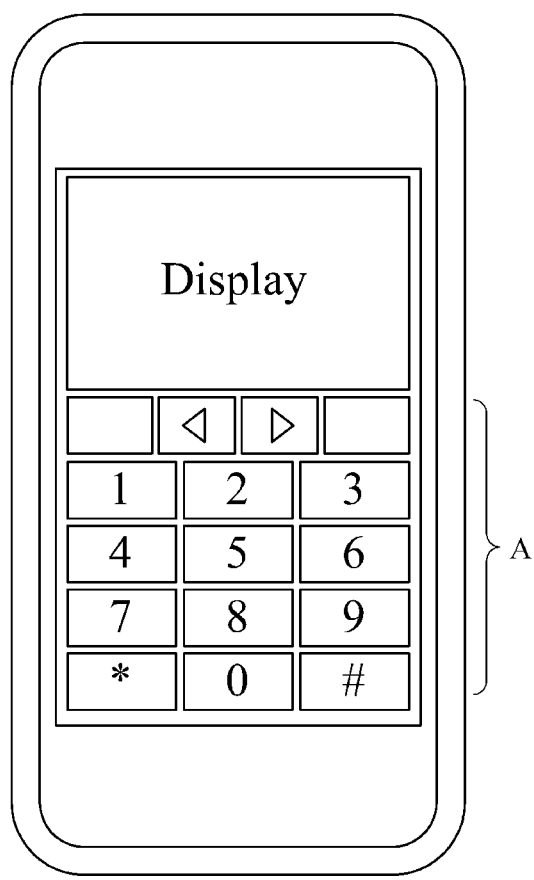
FIGS. 8A to 8D show various examples in which button areas are configured respectively on touch panels, wherein in the examples, the buttons are provided in the forms of numeric keys, Qwerty keys, icon menus and menu bars, respectively.
Figure 8B:
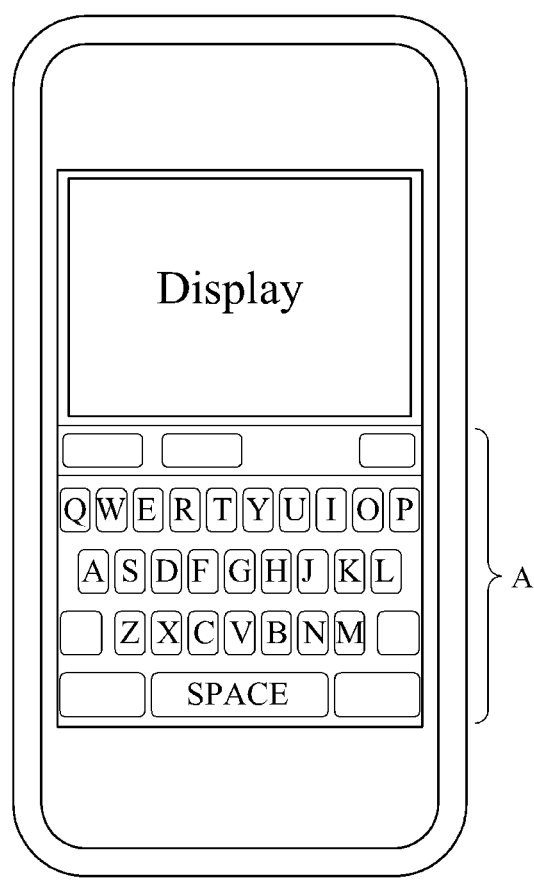
Figure 8C:
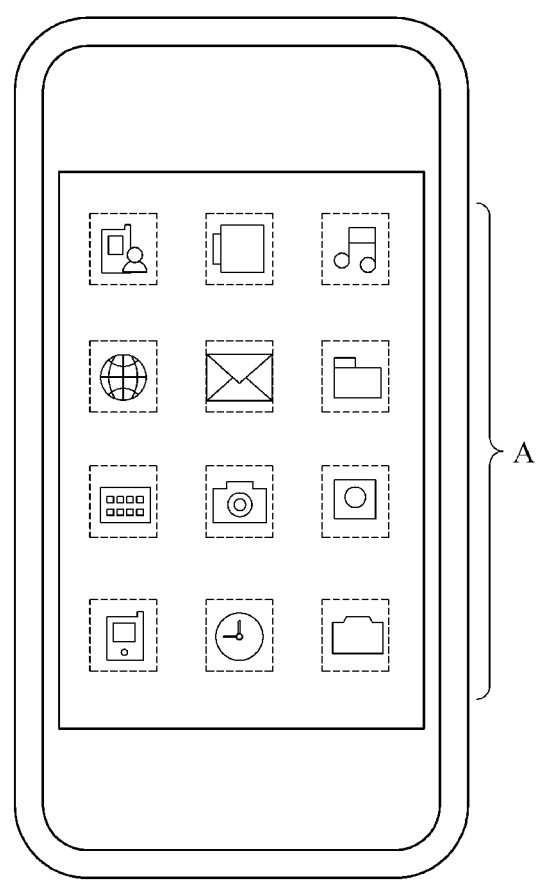
Figure 8D:
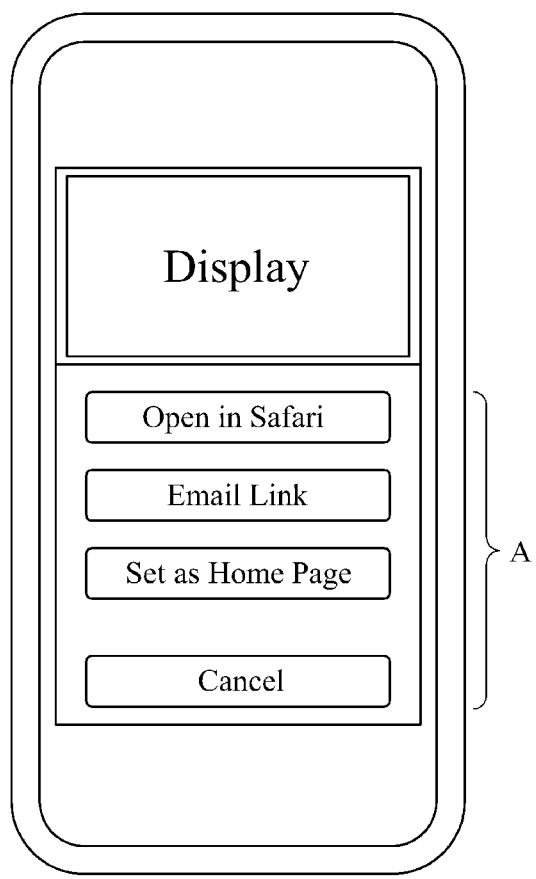

Referring to FIGS. 7A and 7B, in this example, a driving voltage is applied only to driving electrodes corresponding to the edge portions (② and ⑥) around the parts where a button "A" is displayed on a display, and no driving voltage is applied to the parts (③, ④ and ⑤) where the button "A" is displayed or to the outer portions (①, ⑦) of the edge portions. The example illustrated in FIGS. 7A and 7B corresponds to the case where the touch panel parts (③, ④ and ⑤) surrounded by parts (② and ⑥) whose viscosity has been significantly increased are delimited as a button area, and FIGS. 7A and 7B are thus a modification of the example illustrated in FIGS. 6A and 6B. In FIGS. 6A and 6B, the viscosity of electro-rheological fluid is increased in the remaining parts (①, ②, ⑥ and ⑦) around the button area, whereas in FIGS. 7A and 7B, the viscosity of electro-rheological fluid is increased only at the immediate edge portions (② and ⑥) of the button area.

In the touch panel according to the embodiment illustrated in FIGS. 7A and 7B, the peripheral areas which are not the button input area are small, and the edge portion of the button area may be sensed through tactile sense. Hence, since a relatively large number of button areas may be delimited on the user contact surface and also buttons adjacent to each other can be identified through a tactile sensation, the touch panel according to the current embodiment can be usefully applied to applications where many buttons have to be displayed on a small-sized display, such as an application where Qwerty keys are displayed on a display of a mobile phone.

Also, in the touch panel illustrated in FIGS. 6A and 6B and FIGS. 7A and 7B, a repulsive force similar to that felt when pressing a mechanical keypad can be provided to a user. This repulsive force is provided due to the flow of electro-rheological fluid being restricted in the touched button area due to an increase in viscosity of the peripheral area of the touched button area. Also, the touch panel according to the embodiments illustrated in FIGS. 6A and 6B and FIGS. 7A and 7B may offer users a clicking sensation since the fluid in the touched button area abruptly moves to the peripheral areas when a driving voltage is cut off at that time when the gap between upper and lower substrates is reduced to or below a threshold thickness.

The touch panel according to the above-described embodiments functions as a general touch panel in usual use, for example, when an application not using any input is running or when the preceding stage of an application does not use any input. However, when figures, characters, symbols, etc. are input through the touch panel or when an icon is selected and an input signal is generated, the touch panel may function as a user interface. The touch panel according to the above-described embodiments functions as a general touch panel when no driving voltage is applied, and when a driving voltage is applied, the viscosity of the fluid inside the touch panel is locally increased due to an electrostatic force generated locally between upper and lower substrates, so that a button is formed on the touch panel.

The button may be formed on the entire area or a partial area of the touch panel, and the numbers, shapes, sizes, etc. of buttons are not limited. FIGS. 8A to 8D show various examples where button areas are configured respectively on touch panels, wherein in the examples, the buttons are provided in the forms of numeric keys, Qwerty keys, icon menus and menu bars, respectively. Referring to FIGS. 8A through 8D, if a user tries to select a specific application, for example, when a user tries to call, to input a message, to select a menu or to use the Internet, the entire area (the case of FIG. 8C) or the partial area (the cases of FIGS. 8A, 8B and 8D) represented as "A" on the touch panel is used as a user input part. The remaining area except for the area "A" may be used as a display to display characters, figures, etc. which are input. On the other hand, if no driving voltage is applied, the whole touch panel may be used as a display.

If the user presses a specific button and the user's input is recognized, the previous buttons are restored according to the type of application, and the next stage of the application or another application is executed so that another type of button is formed on the touch panel, or no button is formed to return the panel to acting as a general touch panel.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A touch panel comprising:
   a first substrate;
   a second substrate that is spaced apart from the first substrate by a gap, the second substrate comprising a contact surface;
   a plurality of driving electrodes that are formed on each of the first substrate and the second substrate;
   an electro-rheological fluid that fills the gap between the first substrate and the second substrate; and
   a controller configured to apply a driving voltage between at least two opposing driving electrodes of the plurality of driving electrodes such that, a button area is delimited due to a variation in viscosity of a portion of the electro-rheological fluid between the at least two opposing driving electrodes, and cut off the driving voltage when a thickness of the gap between the first and second substrates at the button area is reduced to a value equal to or less than a threshold due to a pressing force applied to the contact surface at the button area.

2. The touch panel of claim 1, wherein the button area is delimited due to an increase in viscosity of the electro-rheological fluid in an area located between the at least two opposing driving electrodes to which the driving voltage is applied.

3. The touch panel of claim 1, wherein a value of the thickness of the gap is determined based on a variation of capacitance at the gap in the button area.

4. The touch panel of claim 1, wherein when the driving voltage is cut off, it is determined that an input is generated at the button area.

5. The touch panel of claim 1, wherein the gap is divided into a plurality of thickness levels, and the value of the thickness of the gap is determined based on the thickness level to which the gap is reduced.

6. A touch panel comprising:
a first substrate;
a second substrate that is spaced apart from the first substrate by a gap, the second substrate comprising a contact surface;
a plurality of driving electrodes including a first electrode formed on the first substrate and a second electrode formed on the second substrate and opposing the first electrode;
electro-rheological fluid that fills in the gap between the first substrate and the second substrate; and
a controller configured to apply a driving voltage between the first and second driving electrodes to divide the contact surface into a first area in which a viscosity of the electro-rheological fluid is increased, and a second area in which a viscosity of the electro-rheological fluid does not vary,
wherein the first area is delimited as a button area for inputting a signal on the user contact surface, and
wherein the controller cuts off the driving voltage if the gap between the first electrode and the second electrode at the button area decreases to a value equal to or less than a threshold due to a pressure applied on the button area.

7. The touch panel of claim 6, wherein the button area is surrounded by the second area.

8. The touch panel of claim 6, wherein when a force exceeding a threshold value is sensed on the button area while the driving voltage continues to be applied to the first and second driving electrodes, the driving voltage is cut off.

9. The touch panel of claim 6, wherein the button area is delimited to correspond to a button which is displayed on a display.

10. A touch panel comprising:
a hard, transparent first substrate;
a deformable, transparent second substrate that is spaced apart from the first substrate by a gap, wherein the gap between the first substrate and the second substrate is varied according to deformation of the second substrate;
a plurality of driving electrodes including a first electrode formed on the first substrate
and a second electrode formed on the second substrate opposing the first electrode;
a plurality of spacers arranged in a dispersed manner in the gap between the first substrate and the second substrate; and
electro-rheological fluid fills the gap between the first substrate and the second substrate; and
a controller configured to apply a driving voltage between at least two opposing driving
electrodes of the plurality of driving electrodes such that, a button area is delimited due to a variation in viscosity of a portion of the electro-rheological fluid between the at least two opposing driving electrodes, and cut off the driving voltage when a thickness of the gap between the first and the second substrates at the button area is reduced to a value equal to or less than a threshold due to a pressing force applied to a contact surface of the second substrate at the button area.

11. The touch panel of claim 10, wherein if a force exceeding a threshold values is sensed on the button area, the driving voltage is cut off.

12. An electronic device comprising:
a first substrate; a deformable second substrate that is spaced apart from the first substrate, wherein a
distance between the first substrate and the second substrate is varied according to deformation
of the second substrate;
a plurality of driving electrodes including a first electrode formed on the first substrate
and a second electrode formed on the second substrate to which a driving voltage is selectively applied; and
electro-rheological fluid interposed between the first substrate and the second substrate;
and a controller configured to apply a driving voltage between at least two opposing driving electrodes of the plurality of driving electrodes such that, a button area is delimited due to a variation in viscosity of a portion of the electro-rheological fluid between the at least two opposing driving electrodes, and cut off the driving voltage when the distance between the first and the second substrates at the button area is reduced to a value equal to or less than a threshold due to a pressing force applied on the button area.

13. The electronic device of claim 12, wherein the distance between the first substrate and the deformable second substrate in the button area is determined based on a capacitance between the first electrode and the deformable second electrode at the button area.

14. The electronic device of claim 12, wherein a space between the first substrate and the deformable second substrate is divided into a plurality of levels, and the distance between the first substrate and the deformable second substrate at the button area is determined based on a level that corresponds to the distance.

15. The electronic device of claim 12, wherein when the driving voltage is cut off, it is determined that an input is generated at the button area.

16. The electronic device of claim 12, wherein in the button area, a first area in which a viscosity of the electro-rheological fluid is increased due to a corresponding electric field is surrounded by a second area in which a viscosity of the electro-rheological fluid does not vary.

17. The electronic device of claim 12, wherein the first substrate, the deformable second substrate, the plurality of driving electrodes and the electro-rheological fluid are formed of transparent materials.

18. A touch panel comprising:
a first substrate;
a plurality of first electrodes formed on the first substrate;
a second substrate separated from the first substrate by a gap and comprising a contact surface;
a plurality of second electrodes formed on the second substrate;
electro-rheological fluid that fills the gap between the first substrate and the second substrate; and
a controller configured to apply a driving voltage to the first and second driving electrodes,
wherein the contact surface includes a plurality of button areas delimited by the first and second electrodes, and
wherein the controller cuts off the driving voltage if the gap between one of the first electrodes and one of the second electrodes at a button area decreases to a value equal to or less than a threshold due to a pressure applied on the button area.

19. The touch panel according to claim 18, further comprising a plurality of spacers interposed between the first substrate and the second substrate.

20. The touch panel according to claim 18, further comprising a driving circuit that is electrically connected to the first electrodes and the second electrodes, wherein the driving circuit selectively applies a voltage between the first electrodes and the second electrodes.

21. The touch panel of claim 19, wherein when a force exceeding a threshold value is sensed on a button area formed by the driving voltage applied to one of the first electrodes and one of the second driving electrodes opposing the one of the second electrodes, the driving voltage is cut off.

22. A touch panel comprising:

a first substrate;

a second substrate that is spaced apart from the first substrate by a gap, the second substrate comprising a contact surface;

a plurality of driving electrodes formed on the first substrate and the second substrate;

an electro-rheological fluid that is disposed in the gap between the first substrate and the second substrate; and a driving circuit that is configured to apply a driving voltage between at least two opposing driving electrodes of the plurality of driving electrodes to thereby delimit a button area due to an change in viscosity of a portion of the electro-rheological fluid between the first and second substrates at the button area, and to cut off the driving voltage applied to the at least two opposing driving electrodes when a thickness of the gap between the first and second substrates at the button area is reduced to a value equal to or less than a threshold due to a pressing force applied to the contact surface at the button area.

23. The touch panel of claim 22, wherein a value of the thickness of the gap is determined based on a variation of capacitance at the gap in the button area.

24. The touch panel of claim 22, wherein when the driving voltage is cut off, it is determined that an input is generated by the pressing force at the button area.

25. The touch panel of claim 22, wherein the contact surface is divided into the button area in which the viscosity of electro-rheological fluid is varied according to an electric field formed between the at least two opposing driving electrodes when the driving voltage is applied by the driving circuit, and another area adjacent to the button area in which the viscosity of electro-rheological fluid does not vary.

26. The touch panel of claim 22, wherein the viscosity of electro-rheological fluid is increased across all of the button area due to an electric field formed between the at least two opposing driving electrodes when the driving voltage is applied to the at least two opposing driving electrodes.

27. The electronic device of claim 22, wherein the viscosity of electro-rheological fluid is increased only at edge portions of the button area due to an electric field formed between the at least two opposing driving electrodes when the driving voltage is applied to the at least two opposing driving electrode.

* * * * *